March 4, 1969    W. T. HARTWELL ET AL    3,430,855
COORDINATE AXIS CONVERTER EMPLOYING A FUNCTION GENERATOR
Filed June 25, 1965    Sheet _1_ of 3

INVENTORS  W. T. HARTWELL
F. C. YOUNG
BY Lucian C. Canepa
ATTORNEY

United States Patent Office 3,430,855
Patented Mar. 4, 1969

3,430,855
COORDINATE AXIS CONVERTER EMPLOYING A FUNCTION GENERATOR
Walter T. Hartwell, Wharton, and Frederick C. Young, New Vernon, N.J., assignors to Bell Telephone Laboratories Incorporated, New York, N.Y., a corporation of New York
Filed June 25, 1965, Ser. No. 466,918
U.S. Cl. 235—197                     17 Claims
Int. Cl. G06f 15/34

ABSTRACT OF THE DISCLOSURE

An all-electronic translator for converting parameters associated with one rectangular coordinate axis system to corresponding parameters associated with a rotated such system includes circuitry for generating two square waves that are displaced in phase by an amount proportional to the angle of rotation between the systems. One square wave is amplitude modulated with the parameters of the original coordinate system and then filtered to generate four sinusoidal carrier waves. In turn, a plurality of synchronous detectors operate on the modulated carriers in a manner determined by the relative phase displacement between the two square waves. The resulting signals correspond to the original parameters multiplied by sinusoids whose argument is the angle of rotation between the systems. By selectively combining these signals the axis parameters for the new rotated system are formed.

---

This invention relates to signal translating circuits and, more specifically, to an arrangement which employs an electronic function generator for converting between rotated coordinate systems.

In many physical applications of practical interest, position-specifying parameters valid in one frame of reference must be converted to a corresponding set of parameters which are useful in an associated, rotated reference system. For example, azimuth and distance information obtaining in a coordinate system particular to a rotatable structure such as an antenna, ship, missile or the like, must often be related to equivalent, absolute spacial quantities.

Prior art embodiments for performing a data translation between rotated coordinate systems have heretofore employed electromechanical structures such as synchros or resolvers as the principal functioning component parts thereof. However, such electromechanical embodiments are inherently relatively slow, and cannot effect the requsite signal conversion when the reference axes rotate at relatively rapid rates of speed.

It is therefore an object of the present invention to provide an improved coordinate axis translating arrangement.

More specifically, an object of the present invention is the provision of a coordinate axis translating embodiment which converts coordinate parameters obtaining in a first system to corresponding parameters which are valid in an associated, rotationally-displaced second coordinate system.

It is another object of the present invention to provide a coordinate axis translating embodiment which is operative at relatively high axis rotational speeds, and which is highly reliable.

These and other objects of the present invention are realized in a specific illustrative axis translating structure which includes digital circuitry for generating two square waves which are displaced in phase by an amount proportional to the angle of axis rotation. One square wave is amplitude modulated with the parameters of the original coordinate system, and then filtered to generate four sinusoidal carrier waves.

A plurality of synchronous detecting arrangements operate on the modulated carriers in a manner determined by the relative phase displacement of the two square waves. The resulting demodulated signals correspond to the original coordinate system parameters multiplied by sinusoids whose argument is the system rotational angle. By suitably combining the demodulated waves, the two axis parameters for the new, rotated system may be derived.

According to another aspect of the invention, the arrangement may advantageously generate any analog function, over a range of arguments therefore, when a periodic analog replica of the derivative of the desired function is available.

It is thus a feature of the present invention that a coordinate axis converting arrangement comprise exclusively electronic, and not electromechanical, circuit elements.

It is another feature of the present invention that a coordinate axis converting arrangement include circuitry for supplying coordinate parameters and rotational angle displacement information, circuitry for generating first and second square wave signals displaced in relative phase in accordance with the angular information, circuitry for modulating the first square wave with the coordinate parameters, and synchronous detecting circuitry for operating on the modulated wave in accordance with the second square wave.

A complete understanding of the present invention and of the above and other features, advantages and variations thereof may be gained from a consideration of the following detailed description of an illustrative embodiment thereof presented hereinbelow in conjunction with the accompanying drawing, in which.

Figure 1:
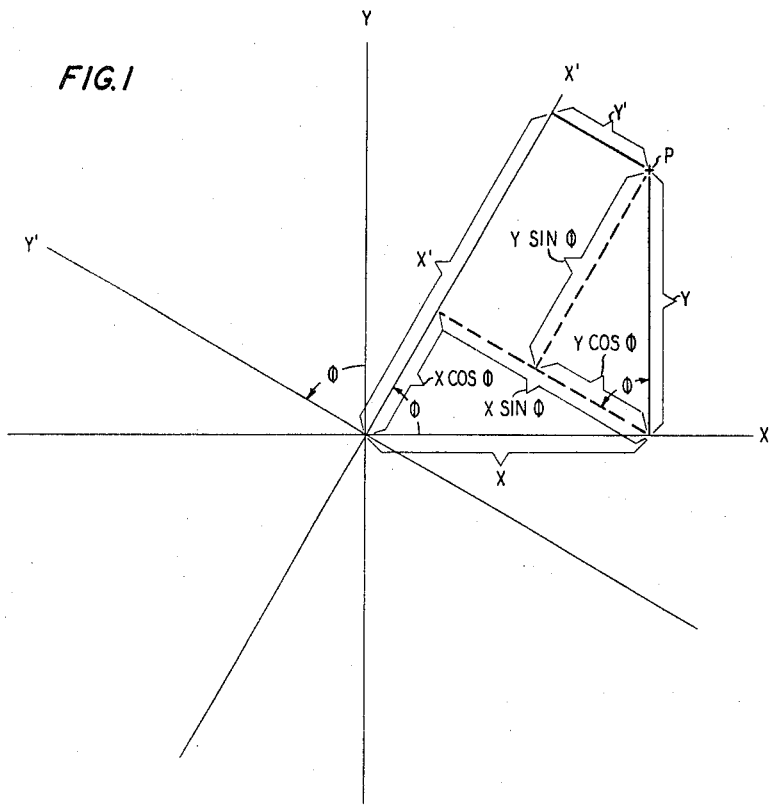
FIG. 1 is a diagram illustrating the relationship between position-specifying parameters included in two rotationally-displaced coordinate systems.

Referring now to FIG. 1, there is shown a first coordinate axis system comprising an abscissa X and an ordinate Y, and a second abscissa-ordinate orthogonal axis pair X'–Y' rotationally displaced therefrom through an angle $\Phi$. A point $P$ is shown in FIG. 1, and is defined by the parameters $x$ and $y$ in the X–Y coordinate system, and by the corresponding quantities $x'$ and $y'$ in the rotated X'–Y' system. From the geometric relationships shown in FIG. 1, it is observed that the rotated parameters $x'$ and $y'$ may be determined from the original system quantities $x$ and $y$ and the angle of the rotation $\Phi$, via the following relationships:

$$x' = x \cos \Phi + y \sin \Phi \tag{1}$$

and $$y' = y \cos \Phi - x \sin \Phi \tag{2}$$

Figure 2:
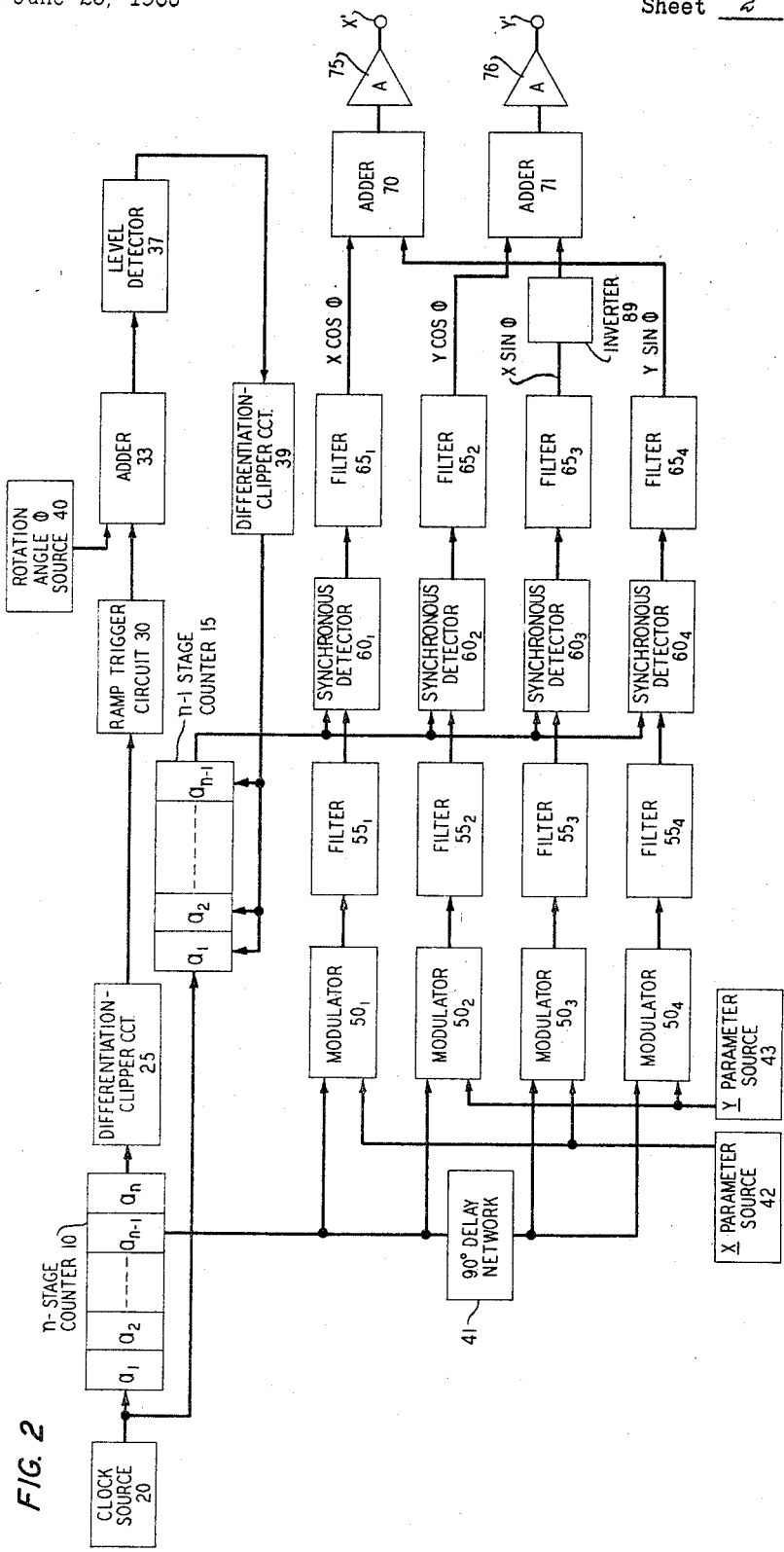
FIG. 2 is a schematic diagram of a specific, illustrative coordinate axis converting arrangement which embodies the principles of the present invention.
Figure 3A:
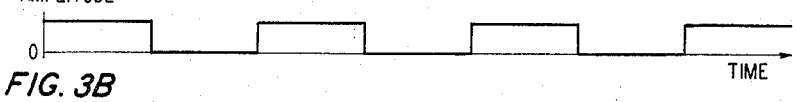
Figure 3B:

Turning now to FIG. 2, there is depicted a specific illustrative coordinate axis translating embodiment for converting between rotated coordinate systems by effecting the two computations respectively indicated in Equations 1 and 2. The arrangement includes an $n$-stage binary counter 10 and an $n-1$ stage binary counter 15 each driven by a clock source 20 of input pulses. Through conventional binary counter action, the final cascaded counter 10 stage $a_n$ supplies one complete square wave, as shown in FIG. 3A, to a differentiating and clipping circuit 25 responsive to each $2^n$ input clock pulses produced by the source 20. The circuit 25 is operative to differentiate the positive-going transient portions of the counter output signals and to clip, or eliminate, any negative-going differentiation products, as illustrated in FIG. 3B.

Figure 3C:
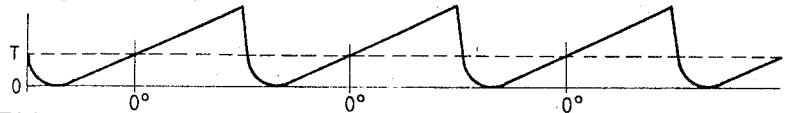
Figure 3D:
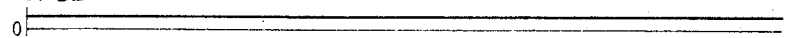

Responsive to each positive pulse supplied thereto by the differentiator 25, a linear ramp trigger circuit 30 of any well known type is adapted to supply a corresponding ramp voltage signal to a first input terminal on an adder 33. The output wave characterizing the ramp circuit 30 is depicted in FIG. 3C. A second input terminal on the adder 33 is connected to a source 40 which supplies a time-dependent analog signal identifying the angle of rotational displacement for the two coordinate systems of interest, i.e., the angle $\Phi$ in FIG. 1. Assuming $\Phi(t)$ to be a constant voltage, as shown in FIG. 3D, corresponding to a fixed angle of axis rotation, the adder 33 supplies the voltage depicted in FIG. 3E to a level detector 37, wherein the FIG. 3E waveform comprises the algebraic sum of the potentials illustrated in FIGS. 3C and 3D.

The level detector 37, which may advantageously comprise a well known monostable Schmitt trigger embodiment, is adapted to supply a relatively high output potential to a differentiating-clipping circuit 39 when the adder 33 output potential exceeds a value T, which comprises the average value of the voltage ramp supplied by the ramp circuit 30 (FIG. 3C). For the FIG. 3E adder 33 output waveform, the level detector output signal (FIG. 3F) attains its relatively high voltage state for a longer time interval than its relatively low voltage state during each cycle of operation thereof, since the adder output signal (FIG. 3E) is greater than the voltage level T for a correspondingly longer period than it is less than the amplitude T. The differentiating-clipping circuit 39 generates positive output pulses during each positive-going transient of the level detector 37 output voltage, as shown in FIG. 3G. These differentiated pulses are coincidentally supplied to each stage $a_1$ of the $n-1$ stage counter 15 to simultaneously reset each counter stage to its relatively low voltage, binary "0" condition.

Figure 3E:
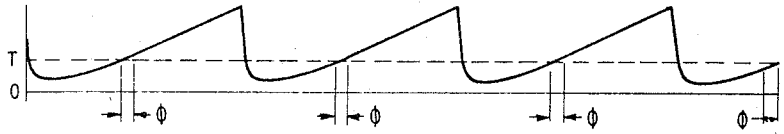
Figure 3F:
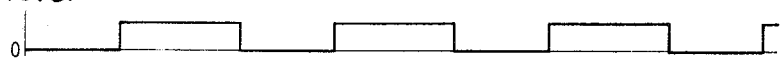
Figure 3G:
Figure 3H:
Figure 3I:
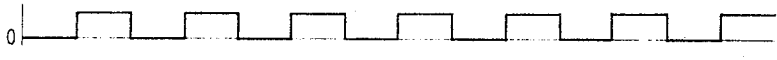

As illustrated in FIG. 3H, the output square wave voltage produced by the final cascaded counter 15 stage $a_{n-1}$ is synchronized by the positive pulses proximately supplied thereto by the circuit elements 39, 37 and 33 under control of the rotational angle signal originated by the source 40. Similarly, a like frequency square wave is generated by the counter 10 stage $a_{n-1}$, as shown in FIG. 3I. However, this last identified waveform is characterized by a fixed phase relationship, since it translates through one complete voltage cycle for every $2^{n-1}$ clock pulses supplied to the counter 10 by the clock source 20 and is independent of any rotational angle signals supplied by the source 40. Accordingly, the square wave output from the counter 15 stage $a_{n-1}$ (FIG. 3H) is displaced in relative phasing to the left (time lead) or right (time lag) of the counter 15 output square wave (FIG. 3I) when the displacement angle source 40 respectively supplies a positive (FIG. 3D) or a negative signal to the adder 33. Moreover, when the source 40 is inactive, the two square waves are in time coincidence.

Figure 3J:
Figure 3K:
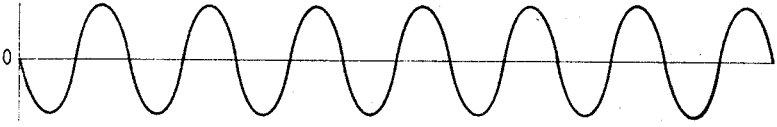

The square wave derived from the counter 10 stage $a_{n-1}$ is directly supplied to two conventional amplitude modulators $50_1$ and $50_2$ and also translated via a 90° delaying network 41, described hereinafter, to two additional amplitude modulators $50_3$ and $50_4$. Further, two signal sources 42 and 43 are adapted to supply analog replicas of the original coordinate system parameters $x$ and $y$ as input variables to the modulators $50_1$ and $50_3$, and $50_2$ and $50_4$ respectively. Each modulator 50 is operative to amplitude modulate the associated input square wave in accordance with the coincidentally-received input $x$ or $y$ parameter (shown in FIG. 3J for the modulator $50_1$ and an assumed constant, direct current $x$ coordinate potential), and to supply the resultant wave to an associated low pass filter 55 which converts the square wave carrier into sinusoidal form (FIG. 3K).

The waveforms present at the output ports of the filters $55_1$ through $55_4$ are next operated on by an associated plurality of cascaded synchronous detectors $60_1$ through $60_4$ in accordance with the timing information embodied in the phase-shifted square wave supplied thereto by the counter 15. More particularly, each detector 60 passes to an interconnected low pass filter 65, a replica of the input wave from the preceding filter 55 during the relatively high voltage portions of the sampling input square wave, and a zero output voltage when the sampling square wave resides in its relatively low voltage condition. For example, the detector $60_1$ generates the waveform shown in FIG. 3L, and depicted in greater detail in FIG. 4, wherein this signal is identical to the filter $55_1$ output waveform (FIG. 3K) when the FIG. 3H square wave generated by the counter 15 resides in its relatively high voltage state, and zero volts when the counter output wave is relatively low.

The low pass filters 65 are adapted to pass only the zero frequency, average direct current component of the synchronously-detected waves. As will be shown hereinafter, the average direct current signals extracted by the filters $65_1$ through $65_4$ respectively comprise entities proportional to the four algebraic quantities included in the system rotational Equations 1 and 2, which quantities are indicated adjacent to the respective output leads of the filters 65 in FIG. 2. The $x \sin \Phi$ quantity is inverted in polarity by an inverter 89 to account for the negative sign in Equation 2, and two adders 70 and 71 are respectively employed to effect the summations given in Equations 1 and 2. Finally, two amplifiers 75 and 76 are respectively connected to the adders 70 and 71 to compensate for all scale changes generated by the particular circuit organizations embodying the modulators 50, the filters 55 and 65, the detectors 60 and the inverter 89. Accordingly, signals representative of the desired $x'$ and $y'$ rotated system parameters are available at the output terminals of the amplifiers 75 and 76.

With the above structure and system functioning in mind, a particular sequence of operation for the FIG. 1 coordinate axis translating structure will now be considered. Assume first, that the rotational displacement angle voltage source 40 and the $x$ and $y$ original coordinate system parameter sources 42 and 43 are each supplying fixed, positive direct current quantities corresponding to a fixed axis displacement and a fixed spacial point.

With the above conditions obtaining, the direct current quantity supplied by the source 40 (FIG. 3D) raises the linear sweep waveform generated by the ramp circuit 30 (FIG. 3C) resulting in the composite wave illustrated in FIG. 3E. Accordingly the level detector 37 is operative in the above described manner to constrain the counter 15 stage $a_{n-1}$ to generate a positive square wave (FIG. 3H) which precedes the counter 10 output wave (FIG. 3I) by an interval representative of the angle $\Phi$ of coordinate axis rotation.

Examining the generation of the $x \cos \Phi$ quantity, which is illustrative of the four algebraic products necessary to effect the computations indicated by Equations 1 and 2, the modulator $50_1$ regulates the amplitude of the counter 10 square wave carrier (FIG. 3I) in accordance with the $x$ parameter supplied by the source 42 (resultant amplitude-modulated wave shown in FIG. 3J), with the filter $55_1$ converting the square wave carrier into a similarly modulated sinusoid (FIG. 3K).

Figure 4:
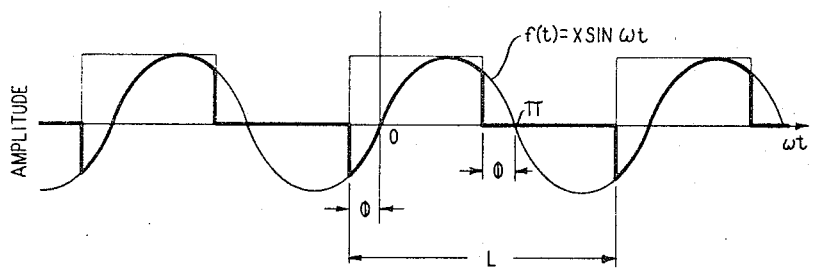
FIGS. 3A through 3L and FIG. 4 comprise timing diagrams illustrating the voltage waveforms associated with selected circuit components illustrated in FIG. 2.
Figure 3L:
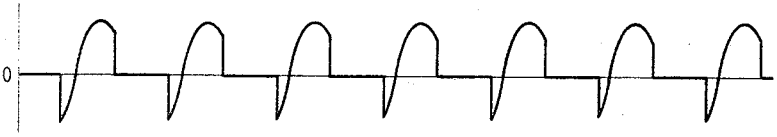

The synchronous detector $60_1$, under control of the phase-displaced square wave originated by the counter 15, operates on the filter $55_1$ output signal in the manner described hereinabove, generating the output waveform shown in FIG. 3L, and illustrated in more explicit detail in FIG. 4. With regard to FIG. 4, placing an ordinate axis at a positive-going time axis crossing of the carrier sinusoid which is thus given by $x \sin \omega t$, the average or direct current value A of the FIG. 4 waveform which will be passed by the cascaded low pass filter $65_1$ is $$A = \frac{1}{L} \int_{-\Phi}^{\pi-\Phi} f(t)dt \qquad (3)$$

where L is the time length of one cyclic period of the waveform. Carrying out the computation, $$A = \frac{1}{L} \int_{-\Phi}^{\pi-\Phi} x \sin \omega t\, dt = kx \cos \Phi \qquad (4)$$

where $k$ is a constant of proportionality which is compensated for by the gain of the associated amplifier 75.

In a similar manner, each combination of elements $50_2$, $55_2$, $60_2$ and $65_2$, $50_3$, $55_3$, $60_3$ and $65_3$, and $50_4$, $55_4$, $60_4$ and $65_4$ are operative in a manner analogous to that described above to produce signals respectively representative of the quantities $y \cos \Phi$, $x \sin \Phi$ and $y \sin \Phi$. With respect to the bottom two series circuit combinations shown in FIG. 1, it is noted that the square wave carrier supplied thereto from the counter 10 is delayed by the element 41 for a time interval corresponding to 90 electrical degrees for the sinusoidal carrier illustrated in FIG. 3K. Since the integrations indicated by Equations 3 and 4 are performed on a sine function displaced in time by 90°, and whereas $$\sin (m+90°) = \cos m \qquad (5)$$

the resulting cosine carriers are integrated to give the indicated $x \sin \Phi$ and $y \sin \Phi$ signals at the outputs of the filters $65_3$ and $65_4$.

As a final step, the $x \sin \Phi$ quantity is inverted by the device 89 (FIG. 2) and the four algebraic functions are then summed and scaled to produce the desired rotated system parameters $x'$ and $y'$ in accordance with the relationships of Equations 1 and 2. Hence, the FIG. 2 arrangement has been shown by the above to take potentials representative of the original system parameters $x$ and $y$ and a signal indicative of an angular rotation $\Phi$, and to derive therefrom signals $x'$ and $y'$ which are valid coordinate parameters obtaining in a new, rotationally-displaced system.

It is noted at this point, that the FIG. 2 arrangement includes circuitry for generating an analog function F of an argument $p$ where a periodic analog replica of the derivative $F'(p)$ of the function $F(p)$ is available. In particular, if an analog waveform of the derivative $F'(p)$ of the desired wave $F(p)$ is supplied as one input of a synchronous detector 60 (e.g. the sine wave supplied to the detector $60_1$ by the filter $55_1$ where a cosine wave is eventually desired), and the output square wave of the counter 15 is time displaced in an amount proportional or equal to the argument $p$ ($\Phi$ in FIG. 2), the output signal derived from the associated cascaded low pass filter 65 yields the desired analog signal $F(p)$.

Also, it is observed that while constant, direct current signals were assumed to be supplied by the sources 40, 42 and 43 in the discussion above, these sources may advantageously supply time-varying signals. In such a case, the frequency characterizing the counter 10 and 15 stages $a_{n-1}$ must be sufficiently high to sample the highest frequency component of the time-varying input parameters without any intelligence loss.

It is to be understood that the above-described arrangement is only illustrative of the application of the principles of the present invention. Numerous other arrangements may be devised by those skilled in the art without departing from the spirit and scope of this invention.

What is claimed is:

1. In combination in a coordinate axis converting arrangement, means for supplying signals representative of coordinate parameters and a signal representative of rotational angular information, means for generating first and second square wave signals displaced in relative phase in accordance with said signal representative of angular information, means for modulating said first square wave signal with said signals representative of coordinate parameters, and synchronous detecting means, including an output terminal, for operating on said modulated wave signal in accordance with said second square wave signal.

2. A combination as in claim 1 wherein said means for generating said first and second square wave signals displaced in relative phase in accordance with said signal representative of rotational angular information comprises first and second counters, a clock source connected to said counters, an input source of independently-variable signals, and circuitry connected to said first counter and said input source for selectively resetting said second counter.

3. A combination as in claim 2 wherein said circuitry comprises the series combination of a ramp trigger circuit, an adder, and level detecting means.

4. A combination as in claim 3 wherein said means for modulating said first square wave signal comprises an amplitude modulator and filter means serially connected thereto.

5. A combination as in claim 4 further comprising additional filter means connected to the output terminal of said synchornous detecting means.

6. In combination in a coordinate axis converting arrangement, means for supplying coordinate parameter data and rotational angular information signals, means for generating first and second square wave signals displaced in relative phase in accordance with said angular information signal, a plurality of modulating structures for operating on said first square wave signal in accordance with said coordinate parameter data signals to provide modulator-generated signals, and a like plurality of synchronous detectors for operating on said modulator-generated signals in accordance with said second square wave signal to provide synchronously-detected signals.

7. A combination as in claim 6 further comprising adder means for combining said synchronously-detected signals.

8. A combination as in claim 7 further comprising a 90° delaying network connected to selected ones of said modulating structures for delaying coordinate parameter data signals applied to said selected structures.

9. A combination as in claim 8 further comprising a first plurality of low pass filters respectively interposed between a different one of said modulators and a different one of said detectors.

10. A combination as in claim 9 further comprising a second plurality of low pass filters respectively serially interposed between a different one of said synchronous detectors and said adder means.

11. A combination as in claim 10 wherein said means for generating said first and second square wave signals displaced in relative phase in accordance with said angular information signal comprises first and second counters, a clock source connected to said counters, an input source of independently-variable signals, and circuitry connected to said first counter and said input source for selectively resetting said second counter.

12. A combination as in claim 11 wherein said circuitry comprises the series combination of a ramp trigger circuit, additional adder means, and level detecting means.

13. A combination as in claim 12 further comprising amplifier means connected to said adder means.

14. In combination in an analog function generator, means for supplying a signal representative of an independently-variable parameter, means for supplying a signal representative of a periodic analog function, means for generating a square wave signal displaced in relative phasing from the signal supplied by said periodic analog function supplying means in accordance with said independently-variable parameter signal supplied by said parameter supplying means, and synchronous detecting means for operating on said signal representative of a periodic analog function in accordance with said square wave signal.

15. A combination as in claim 14 further comprising direct current level extracting means connected to said synchronous detecting means.

16. A combination as in claim 15 wherein said extracting means comprises a low pass filter.

17. A combination as in claim 16 wherein said square wave generating means comprises a clock source, a multistage binary counter driven by said clock source and a series combination comprising a ramp trigger circuit, an adder and a level detector for selectively resetting each stage included in said multistage counter.

References Cited

UNITED STATES PATENTS

| | | | |
|---|---|---|---|
| 2,926,852 | 3/1960 | Bennett | 235—189 |
| 3,068,467 | 12/1962 | Grimaila | 343—5 |
| 3,092,808 | 6/1963 | Wychorski et al. | 340—146.2 |
| 3,187,169 | 6/1965 | Trammell et al. | 235—189 |

MALCOLM A. MORRISON, *Primary Examiner.*

ROBERT W. WEIG, *Assistant Examiner.*

U.S. Cl. X.R.

235—150.53, 189